(12) United States Patent
Bhandari et al.

(10) Patent No.: US 10,423,443 B2
(45) Date of Patent: Sep. 24, 2019

(54) TASK MANAGEMENT INTERFACE

(71) Applicant: Oracle International Corporation, Redwood Shores, CA (US)

(72) Inventors: Sanjay Kumar Bhandari, Redwood Shores, CA (US); Satya Anur, Redwood Shores, CA (US); Tianyi Wang, Redwood Shores, CA (US); Vijay Manguluru, Redwood Shores, CA (US); Andrew Watanabe, Redwood Shores, CA (US); Laura Akel, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 15/478,202

(22) Filed: Apr. 3, 2017

(65) Prior Publication Data

US 2018/0285149 A1    Oct. 4, 2018

(51) Int. Cl.
| | |
|---|---|
| *G06F 9/48* | (2006.01) |
| *G06F 9/50* | (2006.01) |
| *G06F 3/0481* | (2013.01) |
| *G06F 3/0486* | (2013.01) |
| *G06F 9/451* | (2018.01) |
| *G06F 3/0488* | (2013.01) |

(52) U.S. Cl.
CPC .......... *G06F 9/4843* (2013.01); *G06F 3/0486* (2013.01); *G06F 3/0488* (2013.01); *G06F 3/04817* (2013.01); *G06F 9/451* (2018.02); *G06F 9/5005* (2013.01)

(58) Field of Classification Search
None
See application file for complete search history.

(56) References Cited

U.S. PATENT DOCUMENTS

| | | | | |
|---|---|---|---|---|
| 9,727,376 | B1* | 8/2017 | Bills | G06Q 10/0631 |
| 2007/0245300 | A1* | 10/2007 | Chan | G06Q 10/06 717/105 |
| 2008/0082542 | A1* | 4/2008 | Cohen | G06Q 10/00 |
| 2009/0234699 | A1* | 9/2009 | Steinglass | G06Q 10/06 705/7.23 |
| 2012/0240071 | A1* | 9/2012 | Park | G06F 3/0488 715/769 |
| 2016/0170811 | A1* | 6/2016 | Peacock | G06F 9/52 718/106 |
| 2016/0189077 | A1* | 6/2016 | Azmoon | G06Q 10/06316 705/7.26 |
| 2017/0331770 | A1* | 11/2017 | Griffin | H04L 51/043 |
| 2018/0114172 | A1* | 4/2018 | Togwe | G06F 17/2775 |

* cited by examiner

*Primary Examiner* — Wynuel S Aquino
(74) *Attorney, Agent, or Firm* — Invoke

(57) ABSTRACT

Described herein are systems and methods for implementing a task assignment protocol. In one or more embodiments, a task management system receives task data and resource data. Responsive to the receipt, the task management system receives input for selection of a resource. A candidate subset of tasks that match the properties of the resource is then identified. Upon receipt of selection of the candidate task, a task icon updates. The task icon may update to reflect the resource identifier associated the assigned resource. Additionally, or alternatively, a resource icon is updated to reflect the availability of the resource. The protocol repeats until one or more resources are allocated to the tasks. A resource chart additionally displays to aid in evaluation of resource availability.

22 Claims, 9 Drawing Sheets

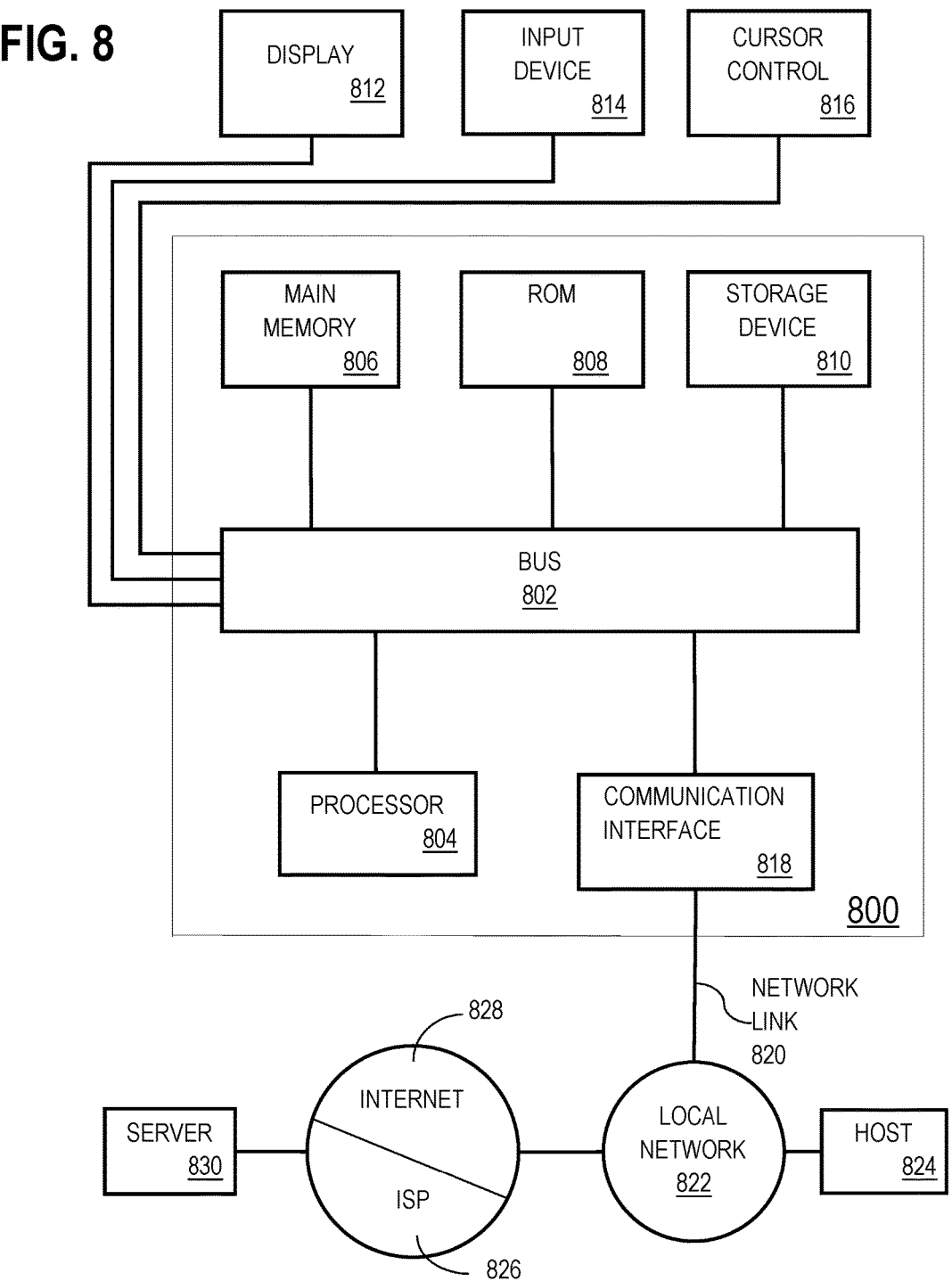

TASK MANAGEMENT INTERFACE

TECHNICAL FIELD

The present disclosure relates to resources assigned to tasks in a task management system.

BACKGROUND

Task management systems display tasks corresponding to various projects. A resource is assigned to a task to execute that task. A resource may be over-allocated to multiple tasks during a period of time. The result of over-allocating a resource may include delay or non-completion of tasks. While a resource may be over-allocated, other resources may remain idle or be under-allocated. Project managers often prefer to avoid over-allocation and under-utilization of resources when possible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 illustrates an example computer system upon which one or more embodiments may be implemented.

DETAILED DESCRIPTION

Figure 1A:
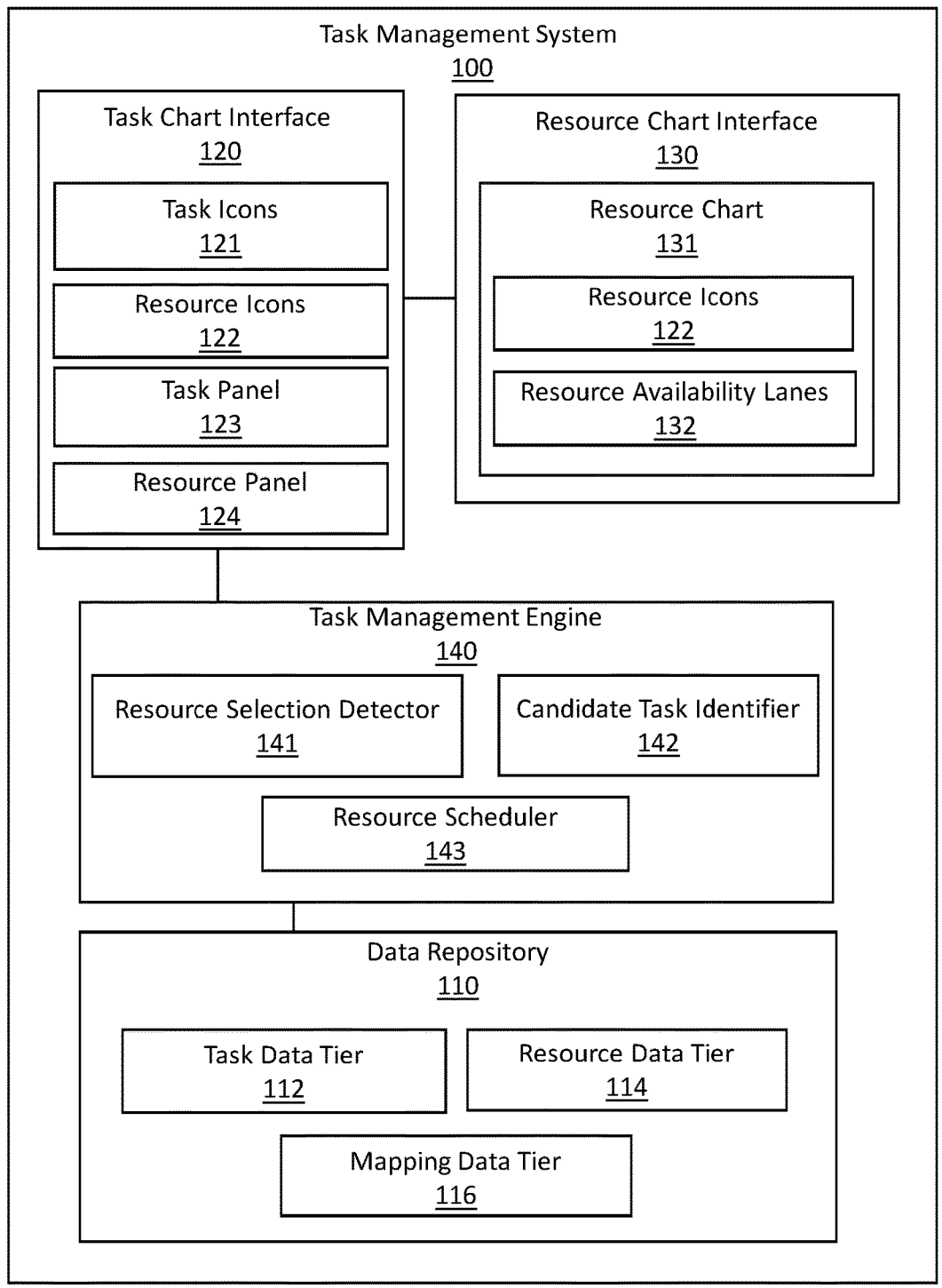
FIG. 1A illustrates an example task management system for allocating resources to tasks, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring of the present invention.

TABLE OF CONTENTS

1. GENERAL OVERVIEW
2. TASK MANAGEMENT SYSTEM ARCHITECTURE
3. TASK ASSIGNMENT PROTOCOL
4. INTERFACE EMBODIMENTS
5. HARDWARE OVERVIEW
6. MISCELLANEOUS; EXTENSIONS

1. General Overview

In one or more embodiments, an interface includes a task management chart with a task panel and a resource panel. A resource icon, in the resource panel, may be displayed with a corresponding visual identifier. As an example, a visual identifier for a resource icon may include a partial circle or a full circle. A full circle indicates that the resource, corresponding to the resource icon, has maximum availability. A partial circle indicates that the resource, corresponding to the resource icon, has partial availability. The circle may be constructed using a unique color or pattern which uniquely identifies the corresponding resource. Tasks, in the task panel, may also be displayed with corresponding visual identifiers. Tasks with unassigned resources and tasks with assigned resources may be represented with different colored visualizations. As an example, a task with an assigned resource may be represented with a grayed-out box to indicate no additional resources are to be assigned to the task.

One or more embodiments include assigning a resource to a task in response to detecting user input comprising a drag and drop action. A system detects that a resource icon is dragged from the resource panel. Responsive to detecting the dragging of the resource icon, the system identifies candidate tasks to which the dragged resource may be assigned. The candidate tasks may include tasks that may be performed by the resource. The system may identify the tasks, associated with resource requirements that are met by the attributes of the dragged resource, as candidate tasks. The system may filter out any candidate tasks which are already assigned to a resource, and therefore not available for assignment to the dragged resource. The system may visually identify the candidate tasks on an interface. As an example, the system may highlight the visualization corresponding to the candidate tasks in response to detecting the dragging of the resource icon. The system may further detect that the dragged resource icon has been dropped onto a visualization of a particular task from the set of candidate tasks. Responsive to detecting that the dragged resource icon has been dropped onto the visualization of the particular task, the system assigns the resource to the particular task. The system updates the visualization of the particular task to illustrate that a resource has been assigned to the particular task. The system may update the visualization of the particular task with a unique color or pattern associated with the assigned resource to illustrate the mapping between the particular task and the assigned resource. Furthermore, the system may update the original resource icon in the resource panel. As an example, the system may update a full circle corresponding to the resource icon to a partial circle to reflect the updated availability of the corresponding resource.

2. Task Management System Architecture

FIG. 1A illustrates an example task management system 100 including a data repository 110, a task chart interface 120, a resource chart interface 130, and a task management engine 140. In one or more embodiments, task management system 100 may include more or fewer components than the components illustrated in FIG. 1A. The components illustrated in FIG. 1A may be local to or remote from each other. The components illustrated in FIG. 1A may be implemented in software and/or hardware. The component may be distributed over multiple applications and/or machines. Multiple components may be combined into one application and/or machine. Operations described with respect to one component may instead be performed by another component.

In one or more embodiments, data repository 110 comprises hardware and/or software configured to store data associated with the task management system 100. As illustrated, data repository 110 includes one or more data records including task data tier 112, resource data tier 114, and mapping data tier 116. In one or more embodiments, the data tiers 112, 114, and 116 include data records and properties or features of those data records, as described in more detail in FIG. 1B.

In one or more embodiments, the data tiers 112, 114, and 116 may connect with one another over one or more data communications networks, such as a storage area network (SAN), local area network (LAN), wide area network (WAN) or the Internet. The tiers 112, 114, 116 may transmit information using one or more network protocols such as protocols within the IP suite. In other embodiments, the tiers 112, 114, 116 may reside on the same host machine. Tiers 112, 114, 116 may transmit using APIs, calls, inter-tier messages, or any other interface that allows different tiers to communicate. The protocols and interfaces used to transmit the data between tiers may vary from implementation to implementation.

Figure 1B:
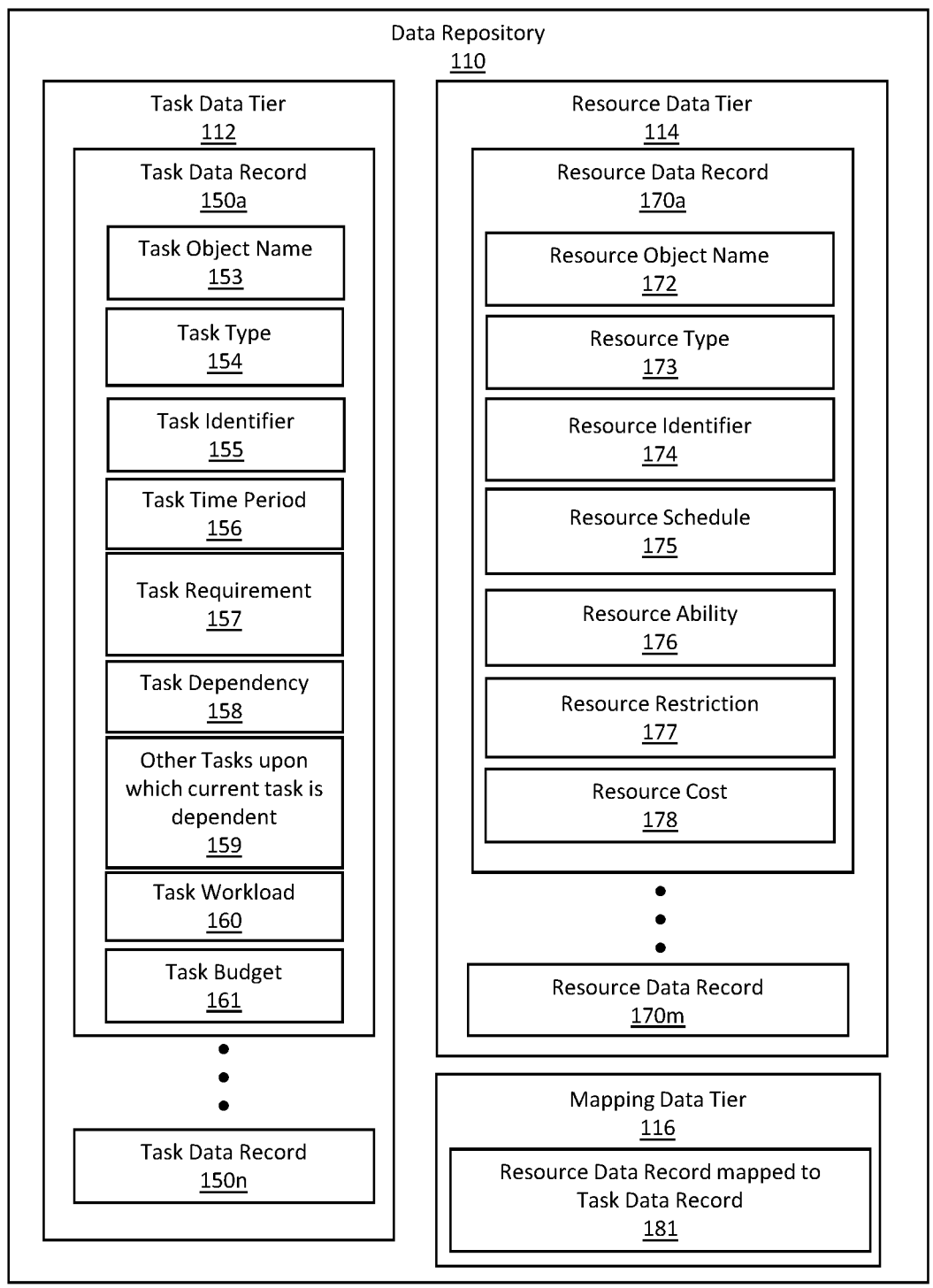
FIG. 1B illustrates example data repositories for a task data tier and for a resource data tier, in accordance with one or more embodiments.

As illustrated in FIG. 1B, in one or more embodiments, the task data tier 112 includes any number of task data records (for example, task data records 150a-150n). When a new object is created, a new data record is generated for storing the object data of the object. For example, the system 100 may receive task data input and generate a corresponding data record. When the object data of an object is changed, the system 100 may generate a new data record for storing the new object data.

In one or more embodiments, a task includes an activity to be executed by a resource or using a resource. For example, a task may include pouring concrete or drafting a report. The same task may be repeated at various times throughout a project. A task data record 150a-150n may include one or more characteristics of a task including but not limited to: a task object name 153, a task type 154, a task identifier 155, task time period 156, a task requirement 157, a task dependency 158, other tasks which current task is dependent upon 159, a task workload 160, and a task budget 161. The system 100 may receive a project work breakdown structure plan and/or other data input to populate the task data records 150a-150n. The task data records 150a-150n correspond to different tasks to be executed.

In one or more embodiments, the task object name 153 in the task data record may include a brief description of the task to be executed. For example, "Draft Report" may be used as a task object name 153. The task type 154 in the task data record may include a reference to the type of task to be executed. For example, the task type may be administrative, include research and writing, data input, data analysis, writing code, or a combination thereof. A task identifier 155 may uniquely identify the task. The task identifier 155 may include a unique numerical value, a unique color, and/or a unique pattern in one or more embodiments. The task object name 153 determines the task identifier 155 and the task type 154 in one or more embodiments.

In one or more embodiments, a task time period 156 may include timing associated with the task. The task time period 156 may include a start time, an end time, a duration, or a combination thereof.

In one or more embodiments, the task requirement 157 specifies an ability of a resource that is required for the resource to successfully execute the associated task. The task requirement 157 may include skill level, knowledge, talents, strength level, quality level, efficiency level, experience level, or a combination thereof of a resource.

In one or more embodiments, a task dependency 158 may include a reference to another task in the same project that depends upon the start or completion of a current task. For example, a second task may start after a first task is specified as complete. A task dependency 158, associated with the second task, indicates a dependency on the first task. In another example, a final task begins after all other tasks have begun. The final task is dependent upon all other tasks. The task dependency 158 of the final task indicates a dependency on all other tasks. A task dependency may be used to generate or modify the task time period 156.

In one or more embodiments, the task workload 160 includes a reference to the number of resources necessary to execute the corresponding task. The number of resources needed to execute a task may be proportional to an amount of time allocated to the task in the task time period 156. In an example, a task may require four resources, of the same type or of a different type, to complete the task in an assigned period of time. A number and/or type of resources may be determined based on a type of the task.

In one or more embodiments, the task budget 161 in the task data record may include a budget within which the task is to be executed. The budget may include a particular expenditure, such as money.

In one or more embodiments, a resource executes a task. Examples of a resource include equipment, facilities, funding, materials, people, and other supplies used to execute a task. The same resource may be allocated to a task at various times throughout a project.

In one or more embodiments, the data record of the resource data tier 114 includes resource data records (e.g., resource data records 170a-170m). The number of resource data records depends upon the project and/or the resource pool. The system 100 may receive a resource plan and/or other data input associated with the resources. The resource data records 150a-150n correspond to different resources.

In one or more embodiments, a resource data record includes information about a resource. A resource data record 170a-170m may include one or more characteristics of a resource including but not limited to: a resource object name 172, a resource type 173, a resource identifier 174, a resource schedule 175, a resource ability 176, a resource restriction 177, a resource cost 178, a resource output quality 179, and a resource efficiency 180.

In one or more embodiments, the resource object name 172 may include a brief description of the resource to be utilized. For example, a resource object name may include financial software. The resource type 173 may include a reference to the type of resource to be utilized. For example, the resource type may include a robot or machine, a natural resource or material, capital resource, or even a human resource. A resource identifier 174 may uniquely identify the resource data record. The resource identifier 174 may include a unique numerical value, a unique color, and/or a unique pattern in one or more embodiments. The resource object name 172 determines the resource identifier 174 and the resource type 173 in one or more embodiments.

In one or more embodiments, a resource schedule 175 record may include availability associated with the resource during the project timeline. The resource schedule 175 may include a start time of availability, an end time, a duration, or a combination thereof.

In one or more embodiments, a resource ability 176 may include an ability of the associated resource to optimize utility of the resource in executing the task. Example resource abilities 176 may include skills, knowledge, talents, strength, experience level, efficiency, quality, or a combination thereof. In an example, the selected resource may include a lower quality level than the task specifies. Thus, upon receipt by the system 100 of an attempt to assign this resource to this task may prompt an error. The task requirement 157 of the associated task may correspond to the resource ability 176 of the assigned resource.

In one or more embodiments, a resource restriction 177 may include unavailability of the resource. Example resource restrictions 177 may include time, budget or other restrictions of the resource to execute a task.

In one or more embodiments, the resource cost 178 may include the anticipated expenditure associated with utilizing a resource for a task and/or a time period. An example resource cost 178 may include a rate of $200. The system 100 may compare the resource cost 178 to the task budget 161 to determine whether assignment of the resource to the task is optimal.

In one or more embodiments, the mapping data tier 116 may include a data record 181 representing the resource data record 170*a*-170*m* mapped to task data record 150*a*-150*n*. Mapping of a resource to a task includes assigning or allocating the resource to the task. The system 100 generates a new data record 181 in the mapping data tier 116 for the assignment.

Returning to FIG. 1A, in one or more embodiments, the task chart interface 120 includes one or more task icons 121 in a task panel 123, and one or more resource icons 122 in a resource panel 124. The task panel 123 comprises one or more tasks to be executed, and representations of one or more resources assigned to tasks. The task icon 121 represents a task in the task panel 123 to be executed. A task icon 121 includes any Graphical User Interface (GUI) component that may be used to visually represent a task. In an embodiment, a set of tasks are presented as a set of rectangular boxes along a task timeline. For purposes of explanation, such rectangular boxes or any other GUI component used to represent a task is referred to herein as a task icon. A resource icon 122 represents a resource that may be allocated to a task. The resource panel 124 comprises one or more resource icons 122.

In one or more embodiments, the resource chart interface 130 includes one or more resource icons 122 displayed in a resource chart 131, and one or more resource availability lanes 132 associated with a resource icon 122. In one or more embodiments, the one or more resource availability lanes 132 illustrate the availability of the associated resource over a period of time or over the project. In one or more embodiments, the resource availability lanes 132 illustrate when the resource is allocated and when the resource is not allocated. Resource availability lanes are illustrated and described in more detail below with reference to FIG. 7. Further, the resource icon 122 may indicate an availability status, as discussed in more detail herein. The system 100 may include a toggle button on the task chart interface 120 and the resource chart interface 130 to toggle between the task chart interface 120 and the resource chart interface 130.

In one or more embodiments, the task management engine 140 comprises a resource selection detector 141, a candidate task identifier 142, and a resource scheduler 143. As described in more detail herein, the resource selection detector 141 detects selection of a resource in the resource panel 124. After resource selection, the candidate task identifier 142 highlights the candidate task available for the selected resource. The resource scheduler 143 detects a selection of a task icon 121 for the resource icon 122.

In one or more embodiments, the resource selection detector 141 detects selection of a resource icon 122 in the resource panel 124. In one or more embodiments, the system may detect selection of the resource icon 122. Detecting the selection of a resource icon 122 may include detecting a mouse pointer hovering over the resource icon 122. Alternatively, or additionally, detecting the selection of a resource icon 122 may include detecting a mouse click on the resource icon 122, detecting user input scrolling or tabbing to the resource icon 122, or detecting the dragging of the resource icon 122 outside the boundary of the resource panel 124.

In one or more embodiments, the candidate task identifier 142 identifies which task (corresponding to a respective task icon 121) is a candidate for the detected resource icon 122. The candidate may be a subset of the tasks that are unassigned or under-assigned to a resource. In one or more embodiments, the candidate task identifier 142 includes an algorithm to determine a candidate task based upon matching of the properties of the unassigned or under-assigned task to the properties of the detected resource. The properties associated with the task and associated with the resource are described with respect to FIG. 1A.

The candidate task identifier 142 highlights a task icon, corresponding to the candidate task, in the task panel 123. A highlight of the candidate task may include a color feature, a blinking feature, or a three-dimensional feature, for example.

In one or more embodiments, the resource scheduler 143 detects a selection of a task for a resource based on user input dragging a resource icon 122 to a task icon 121. In one or more embodiments, the system 100 updates the task icon 121 and the resource icon 122 to indicate the assignment. Alternatively, or additionally, the task chart may display an error signal indicating that the detected task icon 121 is not associated with an identified candidate task. The warning signal may trigger or include a manual override option to select the task icon 121, which was not associated with a candidate task. Additionally, or alternatively, the warning signal may trigger or include an option to return the resource icon 122 to the resource panel 124.

3. Task Assignment Protocol

A. Resource Assigned to a Task in a Task Chart

Figure 2:
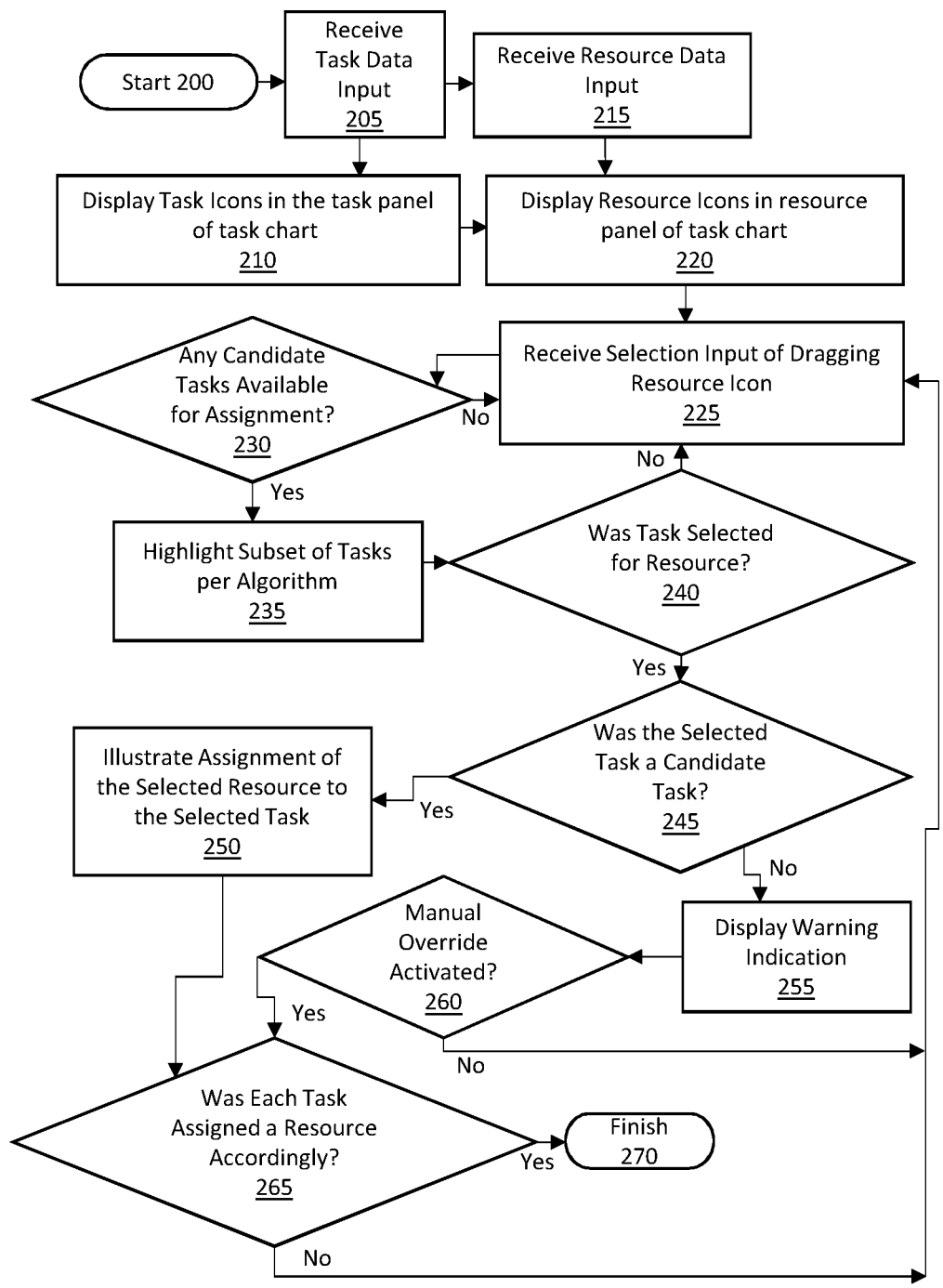
FIG. 2 illustrates an example set of operations for implementing a task management system for allocating resources to tasks in a task chart, in accordance with one or more embodiments.

In one or more embodiments, the task management system 100 is configured to assign one or more resources to a task. FIG. 2 illustrates an example set of operations for implementing a task assignment protocol, in accordance with one or more embodiments. Upon the start of the task assignment protocol (Operation 200), the task management system 100 receives task data records 150*a*-150*n* (Operation 205). The task management system 100 imports the task data records 150*a*-150*n* from a project work breakdown structure plan and/or another data input source. In response to receipt of the task data, the task icon 121 is populated in the task panel 123 of the task chart interface 120 (Operation 210). Additionally, the task management system 100 receives resource data records 170a-170m (Operation 215). The system 100 imports resource data records 170a-170m from a resource plan and/or another data input source. In response to receipt of the resource data, a corresponding resource icon 122 is populated in the resource panel 124 of the task chart interface 120 (Operation 220).

In one or more embodiments, the resource selection detector may detect input selecting a resource by detecting the selection of a resource icon corresponding to a resource (Operation 225). Detecting the selection of resource may include detecting that a mouse pointer is being used to drag the resource icon corresponding to the resource. Detecting the selection of the resource may include determining that the corresponding resource icon has been dragged out of the resource panel. Detecting the selection of the resource may include determining that the corresponding resource icon has been dragged out of the resource panel and into the task panel.

In response to detecting the selection of a resource, the candidate task identifier determines whether any candidate tasks are identified to which the selected resource may be assigned (Operation 230). The candidate task identifier may identify candidate tasks by using an algorithm to match properties of the unassigned or under-assigned task to the properties of the selected resource. If the candidate task identifier identifies candidate subset of tasks, the candidate task identifier 142 highlights the candidate subset of tasks per the algorithm (Operation 235). Highlighting of the task icons may indicate to a user that the selected resource may be assigned to the tasks represented by those associated task icons. The associated task icon may include a color feature, a blinking feature, or a three-dimensional feature, for example.

If the candidate task identifier does not identify any candidate tasks for a selected resource, the system may present a message indicating that the selected resource may not be assigned to any of the tasks. Alternatively, or additionally, the system may gray out all task icons or otherwise visually indicate that the resource icon for the selected resource may not be dragged to any of the task icons. The process may then return to Operation 225 for selection of a different resource icon.

Once a candidate task is highlighted, the task management system may determine whether a task is selected for the resource represented by the selected resource icon 122 (Operation 240). The task management system may determine that a task has been selected for the resource by a detection using the resource scheduler. The resource scheduler may detect a selection of a task for a resource based on user input dragging a resource icon to a task icon. If a task is not selected, no change is made in the task panel. Specifically, the task panel is not updated to illustrate any assignment of a resource to a task as no assignment has been completed. The process may then return to Operation 225 for selection of a different resource icon.

If a task is selected for the resource, then the system determines whether the selected task is one of the candidate tasks for the resource (Operation 245). The system compares the selected task to the candidate tasks that were identified for the resource. If the selected task is in the list of candidate tasks determined for the resource, then the selected task is one of the candidate tasks for the resource. If the selected task is not found in the list of candidate tasks for the resource, then the selected task is not one of the candidate tasks for the resource.

If the selected task is determined to be one of the candidate tasks for the resource, then the resource is assigned to the selected task by the resource scheduler. The task chart interface is updated to illustrate assignment of the selected resource to the selected task (Operation 250). As an example, a pattern associated with a resource icon corresponding to the selected resource is added as a filler to the task icon corresponding to the selected task. Additionally, the resource chart interface is updated to illustrate availability of the selected resource. As an example, a pattern in the border of the resource icon corresponding to the assigned resource is reduced corresponding to the workload associated with the selected task.

If the selected task is not found in the list of candidate tasks for the resource, the task chart may display a warning signal (Operation 255). The warning signal may indicate that the task icon is not associated with an identified candidate task. The warning signal may indicate an error for the user. The warning signal may be text and/or a symbol.

In response to the warning signal, the system 100 determines whether a manual override to permit the task icon 121 selection has been activated (Operation 260). If no manual override has been activated, the resource icon may return to the resource panel. The process may then return to Operation 225 to select another resource icon. If the manual override has been activated, the task and resource icons 121, 122 update, respectively, per Operation 250.

In response to the task icon and resource icon updates, the system 100 determines whether the tasks associated with the task icons in the task panel have been assigned adequate resources (Operation 265). For example, adequate resources may include enough resources to complete the task and the task workload in a timely manner. If any task has not been assigned adequate resources for execution", the process returns to Operation 225 to select an available resource icon. If the all tasks have been assigned adequate resources for execution, the process finishes (Operation 270).

B. Resource Availability in a Resource Chart

Figure 3:
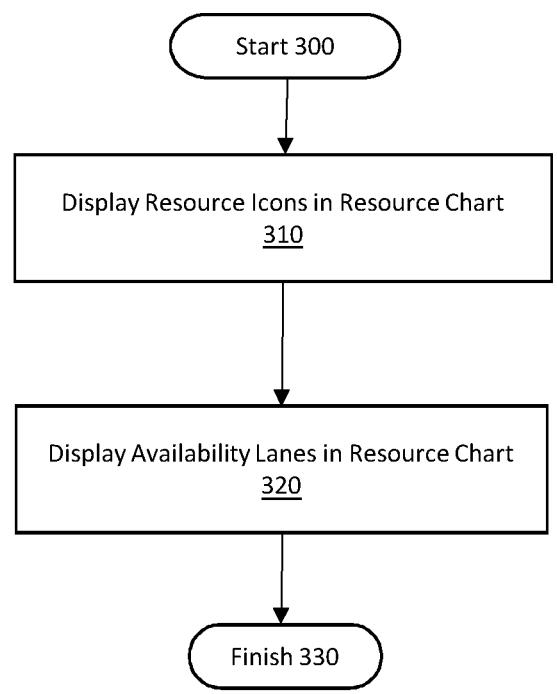
FIG. 3 illustrates an example set of operations for implementing a task management system for allocating resources to tasks in a resource chart, in accordance with one or more embodiments.

In one or more embodiments, the task management system 100 displays resource availability in the resource chart. FIG. 3 illustrates an example set of operations for implementing the task assignment protocol, in accordance with one or more embodiments. Upon the start (Operation 300), the task management system displays one or more resource icons in the resource chart (Operation 310). The resource icon represents a resource. The resource icon may also represent associated availability of a resource through representative shading of the resource icon. The resource icon in the resource chart may be the same as the resource icon illustrated in the resource panel of the task chart interface.

The task management system may additionally display the resource availability lane in the resource chart (Operation 320). The resource availability lane corresponds to the resource icon. The resource availability lane represents time periods when the resource associated with the resource icon is available and when the resource is scheduled to execute a task. The resource availability lane is described in more detail herein with reference to FIG. 7.

After displaying the resource icons and associated availability lanes, the task assignment protocol finishes (Operation 330).

4. Interface Embodiments

A. Task Chart Interface

Figure 4:
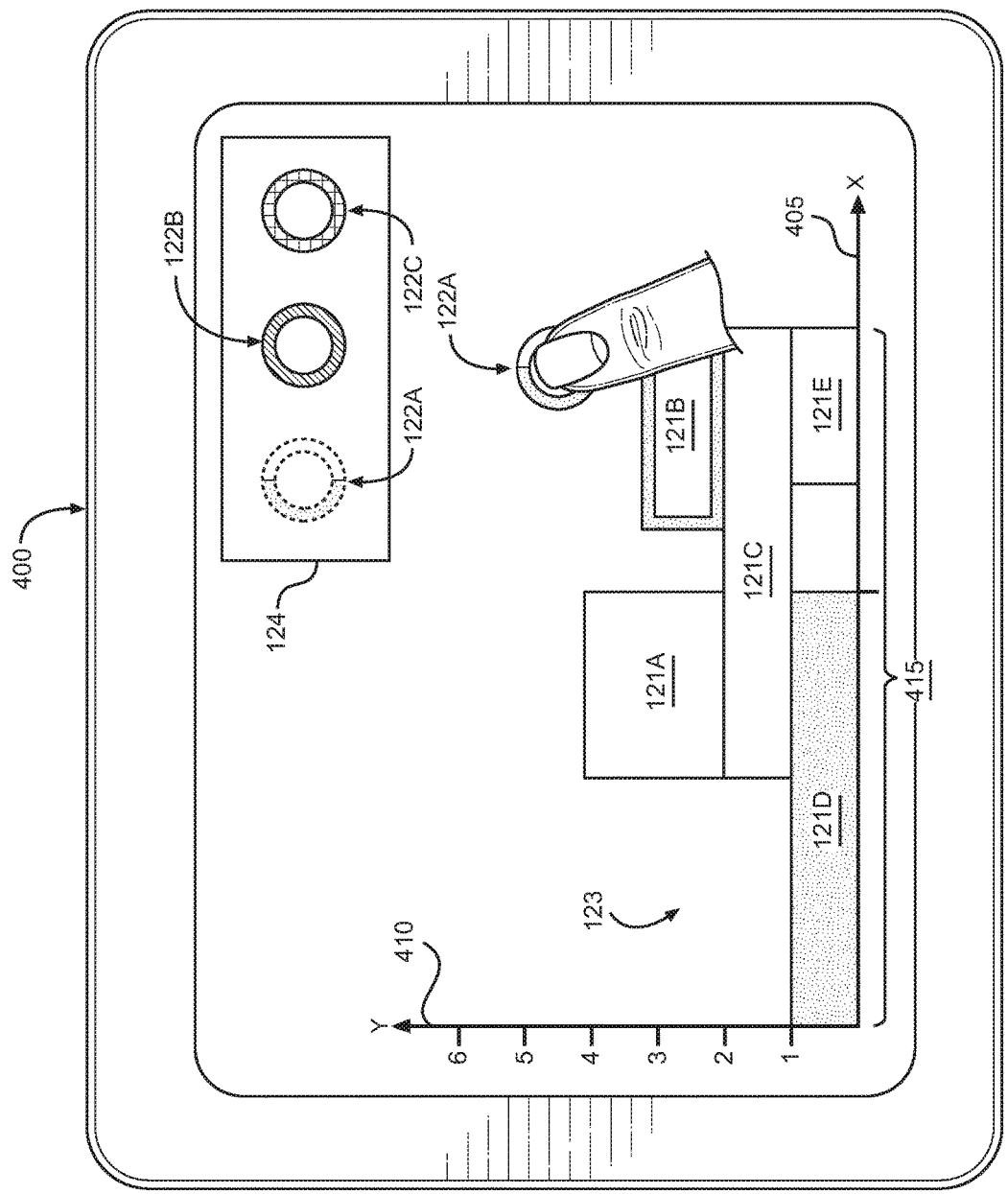
FIGS. 4-6 illustrate example task charts of a task management system and associated example features, in accordance with one or more embodiments.
Figure 5:
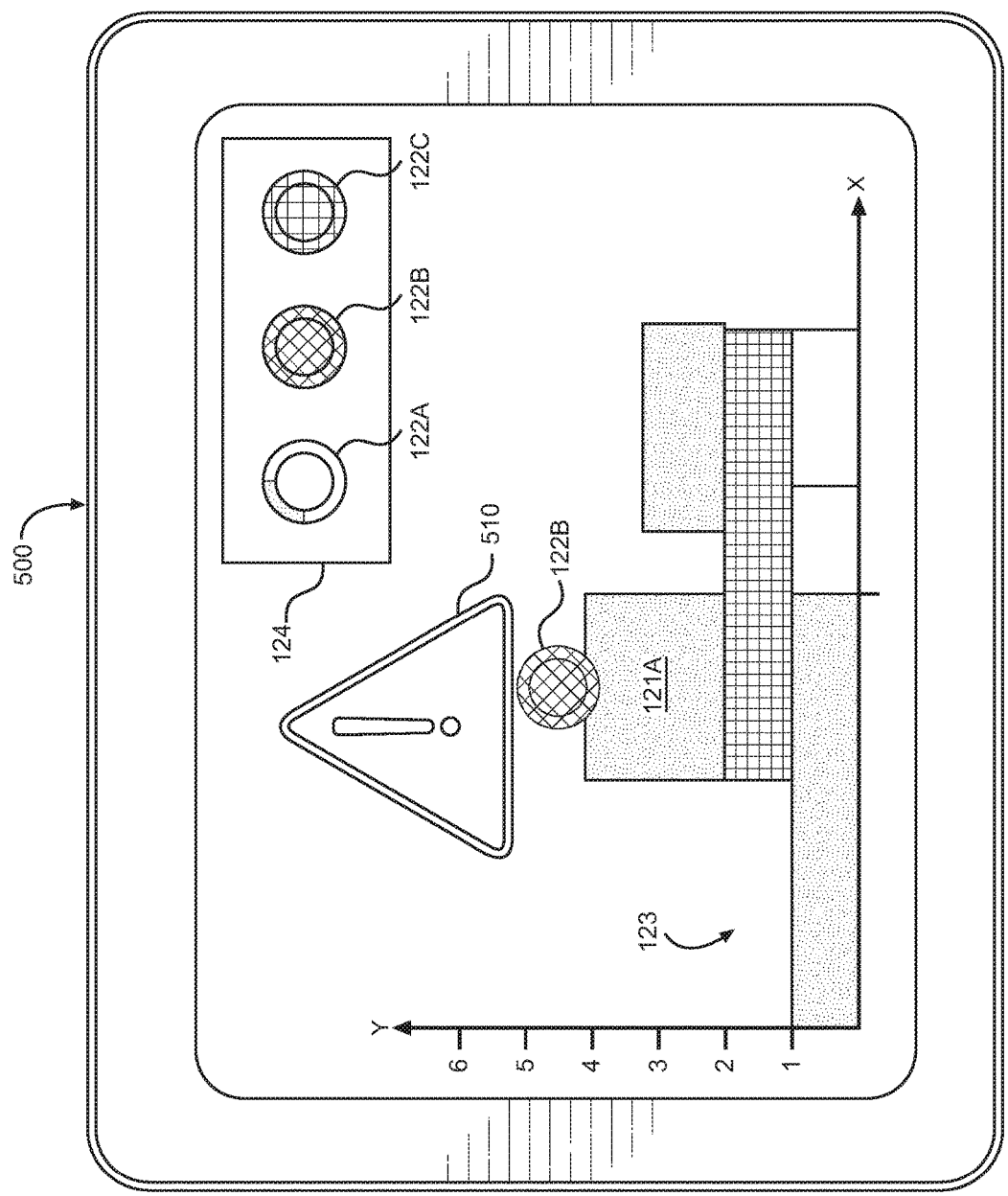
Figure 6:
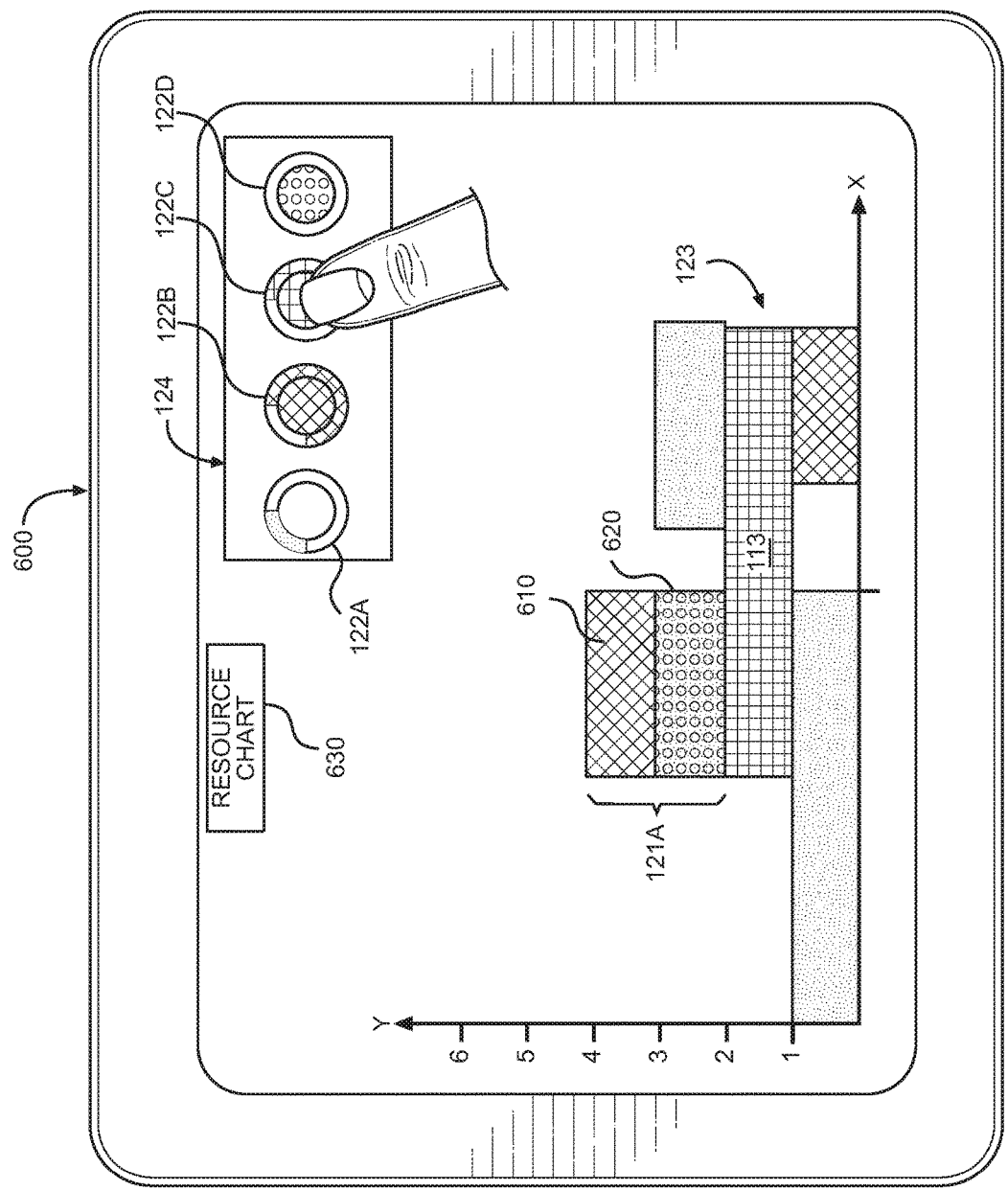

FIGS. 4-6 illustrate example task charts 400, 500, 600 of the task management system 100 and associated example features, in accordance with one or more embodiments.

In the embodiment of FIG. 4, the task chart 400 includes the task panel 123. The task chart 400 may include task icons 121A-121E. The task icon represents a task to be executed by a resource. The task icons may be shaded with a pattern or color corresponding to the resource icon assigned to that corresponding task. A candidate task may be a highlighted task icon identified by the candidate task identifier.

The task panel 123 includes a graph with an x-coordinate 405 referring to time and a y-coordinate 410 referring to workload, in this example. Along the x-coordinate are a plurality of tasks for a project. The tasks may have varying time periods for completion. As shown, the task icons may overlap, indicating that the tasks may be executed simultaneously. The duration of the project to complete the tasks is shown as timeline 415. The workload of the tasks in the task chart corresponds to resources needed to execute the task. For example, the task may require more or higher efficiency resources to execute on time and accurately.

In the embodiment of FIG. 4, the task chart 400 additionally includes the resource panel 124. The resource panel 124 may include resource icons 122A-122C. The resource icons 122A-122C may have different indicators for quick identification. The resource icons may have a unique pattern or color, for instance.

In one or more embodiments, the system 100 receives selection input when resource icon 122A is selected. The candidate subset of tasks may then be highlighted, as described herein. In particular, the task icon 121B may be highlighted as a potential match between the associated task and the resource for the resource icon 122A. The task icons 121A, 121C, and 121E may not be highlighted to indicate they are not associated with an optimal match for resource of resource icon 122A. The task icon 121D may also not be highlighted. The task icon 121D indicates that resource associated with resource icon 122A is already assigned to the associated task due to their similar icon patterns. As a result, in this embodiment, the resource icon 122A indicates partial availability of the associated resource. In this example, the partial availability indicated is proportional to the amount of shading of the resource icon 122A.

In one or more embodiments, the task icon 121A includes twice as many workload units as compared with the other task icons 121B through 121E. As a result, the resource assigned to task of task icon 121A may be more efficient than other resources or may have more availability, for example. Additionally, or alternatively, more than one resource is allocated to task of task icon 121A as shown in FIG. 6.

In the embodiment of FIG. 5, the task chart 500 illustrates warning indicator 510. In this embodiment, the warning indicator 510 may activate upon system detection of selection of the task icon 121A for the resource icon 122B as described herein. The task icon 121A is not a candidate identified by the candidate identifier. Therefore, the illustrated resource-task pair is a non-optimal match, and the resource may not complete the task in a quality or timely manner. The system may provide the user with an override option. The override option may allow the user to assign the resource of resource icon 122B to the task of task icon 121A.

In the embodiment of FIG. 6, the task chart 600 illustrates the task icon 121A with more than one allocated resource. The task chart interface of the task chart 600 separates the task icon 121A into task sub-components 610 and 620. In one or more embodiments, the task sub-components 610 and 620 represent a unit of the task workload 160 associated with the task icon 121A. The resources associated with resource icons 122B and 122D are allocated to sub-components 610 and 620, respectively.

In one or more embodiments, the task chart 600 may include a toggle button 630 to switch the task chart interface to the resource chart 131 associated with the task chart 600. One embodiment of the resource chart is illustrated in FIG. 7.

B. Resource Chart Interface

Figure 7:
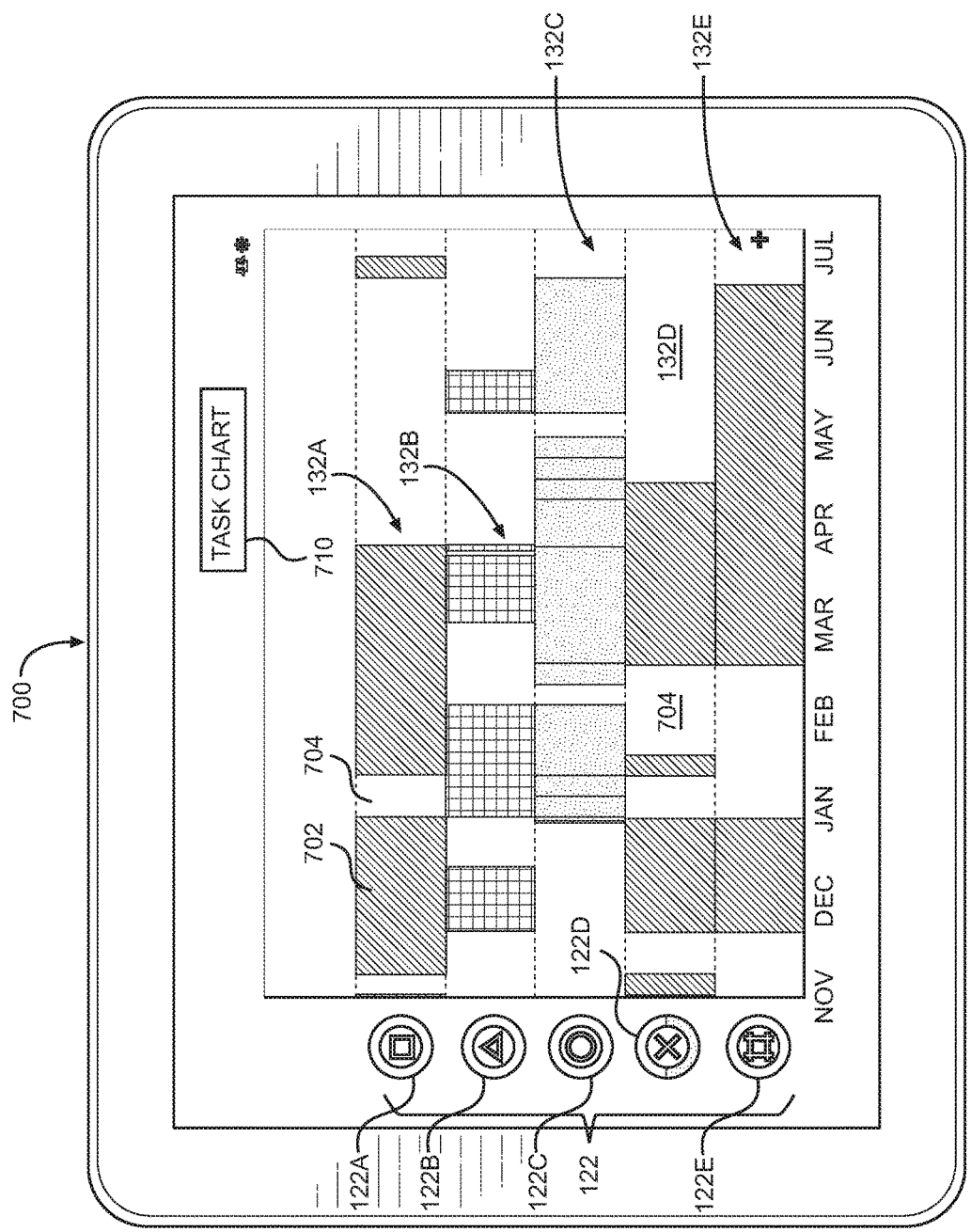
FIG. 7 illustrate an example resource chart of a task management system and associated example features, in accordance with one or more embodiments.

FIG. 7 illustrates an example resource chart 700 of the task management system 100 and associated example features, in accordance with one or more embodiments. The resource chart 700 includes one or more resource icons 122 and associated resource availability lanes 132. The resource availability lane may include availability status of an associated resource at points of time in the project.

In one or more embodiments, the resource availability lane 132 includes blocked components 702 indicating the associated resource is not available during that time. The resource may be scheduled during that time with one or more tasks during the time associated with the blocked component. Additionally, or alternatively, the resource may have a schedule restriction during the time of the blocked component.

The availability lanes 132 may additionally include free components 704 in between blocked components 702. The free components 704 indicate the associated resource is not utilized on the particular project during that associated time period. The resource may or may not have availability during the time period associated with the free component 704. For example, the resource icon 122C has a free component 704 in the associated availability lane 132C. However, the resource icon 122C has an open outer circle, which indicates no additional availability. In another example, the resource icon 122D has a free component 704 in the associated availability lane 132D. The resource icon 122D has a partially-filled outer circle, which indicates that the resource associated therewith has partial availability. The resource of resource icon 122D may be assigned to a task during that time associated with the free component 704.

In one or more embodiments, the resource chart 700 may include a toggle button 710 to switch the interface to the associated task chart 400, 500, 600.

5. Hardware Overview

According to one embodiment, the techniques described herein are implemented by one or more special-purpose computing devices. The special-purpose computing devices are hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices include desktop computer systems, portable computer systems, handheld devices, networking devices or any other device that incorporates hard-wired and/or program logic to implement the techniques.

For example, FIG. 8 is a block diagram that illustrates computer system 800 upon which one or more embodiments may be implemented. Computer system 800 includes bus 802 or other communication mechanism for communicating information, and hardware processor 804 coupled with bus 802 for processing information. Hardware processor 804 is, for example, a general purpose microprocessor.

Computer system 800 also includes main memory 806, such as a random access memory (RAM) or other dynamic storage device, coupled to bus 802 for storing information and instructions to be executed by processor 804. In an embodiment, main memory 806 also stores temporary variables or other intermediate information during execution of instructions to be executed by processor 804. Such instructions, when stored in non-transitory storage media accessible to processor 804, render computer system 800 into a special-purpose machine that performs the operations specified in the instructions.

Computer system 800 further includes read only memory (ROM) 808 or other static storage device coupled to bus 802 for storing static information and instructions for processor 804. Storage device 810, such as a magnetic disk or optical disk, couples to bus 802 for storing information and instructions.

Computer system 800 couples via bus 802 to display 812, such as a cathode ray tube (CRT), liquid crystal display (LCD), or light-emitting diode (LED), for displaying information to a computer user. Input device 814, which may include physical and/or touchscreen based alphanumeric keys, couples to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the system 800 performs the techniques herein in response to processor 804 executing one or more sequences of one or more instructions contained in main memory 806. Such instructions are read into main memory 806 from another storage medium, such as storage device 810. Execution of the sequences of instructions contained in main memory 806 causes processor 804 to perform the process steps described herein. In alternative embodiments, the system 800 uses hard-wired circuitry in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

In embodiments, various forms of media carry one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 720 connected to local network 722. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 818, which carry the digital data to and from computer system 800, are example forms of transmission media.

Computer system 800 can send messages and receive data, including program code, through the network(s), network link 720 and communication interface 818. In the Internet example, server 730 might transmit a requested code for an application program through Internet 728, ISP 726, local network 722 and communication interface 818.

In one or more embodiments, the processor 804 executes the received code as it is received, and/or stored in storage device 810, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are illustrative rather than regarded in a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. One or more non-transitory machine-readable media storing instructions which, when executed by one or more hardware processors, cause:
    displaying a plurality of task icons representing a plurality of tasks in relation to respective time periods;
    displaying a plurality of resource icons representing a plurality of resources;
    receiving a first input selecting a first resource icon from the plurality of resource icons;
    identifying a subset of the plurality of tasks as a candidate set of tasks that can be executed by the first resource; and
    responsive to receiving the first input, temporarily modifying the display of a subset of task icons of the plurality of task icons corresponding to the subset of the plurality of tasks to illustrate that each task of the subset of the plurality of tasks can be executed by the first resource;
    receiving a second input associating the first resource icon to a first task icon of the subset of task icons having a temporarily modified display; and
    based on the first input and the second input, modifying the first task icon to illustrate an assignment of a first resource corresponding to the first resource icon.

2. The media of claim 1, wherein the candidate set of tasks is based on properties of the first resource and properties of the candidate set of tasks.

3. The media of claim 1, wherein identification of the subset of task icons includes a visual feature associated with the subset of the plurality of tasks.

4. The media of claim 1, wherein receiving the second input comprises detecting the first resource icon being dragged to and dropped on the first task icon.

5. The media of claim 1, wherein the candidate set of tasks excludes a first task when a time period associated with the first task overlaps with a time period associated with a second task assigned to the first resource.

6. The media of claim 1, the instructions further causing: visually indicating remaining availability of the first resource by modifying the resource icon accordingly in relation to a workload of a selected task.

7. The media of claim 1, the instructions further causing: assigning multiple resources to one of the task icons.

8. The media of claim 1, the instructions further causing: displaying a first chart with a first axis reflecting a workload for a corresponding task associated with the plurality of task icons representing the plurality of tasks in relation to respective time periods.

9. The media of claim 1, the instructions further causing: displaying a second chart with a first axis reflecting a capacity for a corresponding resource.

10. The media of claim 1, the instructions further causing: assigning at least one resource icon to each task icon based on a task workload, and a plurality of resource properties.

11. The media of claim 1, the instructions further causing: real-time identification of over-allocation of the first resource in response to receiving the second input associating the first resource icon to a first task icon.

12. The media of claim 1, the instructions further causing: receiving a task property input from a project work breakdown structure plan associated with a plurality of task-specific properties for the plurality of task icons.

13. The media of claim 1, the instructions further causing: receiving a third input from a resource plan associated with a plurality of resource-specific properties for the plurality of resource icons.

14. The media of claim 1, wherein the instructions further cause:
    subsequent to receiving the input selecting the first resource icon and prior to receiving the input associating the first resource icon to the first task icon:
        identifying a subset of the plurality of tasks as a candidate set of tasks that can be executed by the first resource;
        temporarily modifying a subset of task icons of the plurality of task icons corresponding to the subset of tasks to illustrate that the first resource icon is capable of being associated with at least one of the subset of task icons,
            wherein the candidate set of tasks is based on a plurality of properties of the first resource and of properties of the candidate set of tasks,
            wherein the candidate set of tasks excludes a first task when a time period associated with the first task overlaps with a time period associated with a second task assigned to the first resource,
    visually indicating remaining availability of the first resource by modifying the resource icon in relation to a workload of a selected task;
    assigning multiple resources to one of the subset of task icons;
    displaying a first chart with a first axis reflecting a workload for a corresponding task associated with the plurality of task icons representing the plurality of tasks in relation to respective time periods;
    displaying a second chart with a first axis reflecting a capacity for a corresponding resource;
    assigning at least one resource icon to each task icon based on a displayed time scale, the workload for the corresponding task, a resource availability, and a plurality of other resource properties;
    visually identifying in real-time over-allocation of the first resource in response to receiving input associating the first resource icon to a first task icon;
    receiving input from a project work breakdown structure plan associated with the plurality of properties for the plurality of task icons; and
    receiving input from a resource plan associated with the plurality of properties for the plurality of resource icons.

15. The media of claim 1, wherein displaying a plurality of task icons representing a plurality of tasks in relation to respective time periods comprises:
- displaying the plurality of task icons on a graph having a first axis and a second axis;
- wherein the first axis represents time and a particular task icon is positioned on the first axis according to the starting time of the particular task represented by the particular task icon and the size of the particular task icon along the first axis indicates how long resources assigned to the particular task are expected to spend performing the task;
- wherein the second axis represents an amount of resources for the particular task, and the size of the particular task icon along the second axis indicates a number of simultaneous resources.

16. The media of claim 15, wherein the first resource is displayed using a color or shading pattern that is associated with the first resource and distinct from other resources; and
- modifying the first task icon to illustrate an assignment of the first resource corresponding to the first resource icon comprises displaying the first task icon using the color or shading pattern that is associated with the first resource.

17. The media of claim 16, wherein a first task of the plurality of tasks that is represented by the first task icon requires a plurality of resources, and
- displaying within the first task icon a plurality of subcomponents, each subcomponent corresponding to a distinct resource, and
- displaying each subcomponent using the color or shading associated with the corresponding distinct resource.

18. A method comprising:
- displaying a plurality of task icons representing a plurality of tasks in relation to respective time periods;
- displaying a plurality of resource icons representing a plurality of resources;
- receiving a first input selecting a first resource icon from the plurality of resource icons;
- identifying a subset of the plurality of tasks as a candidate set of tasks that can be executed by the first resource; and
- responsive to receiving the first input, temporarily modifying the display of a subset of task icons of the plurality of task icons corresponding to the subset of the plurality of tasks to illustrate that each task of the subset of the plurality of tasks can be executed by the first resource;
- receiving a second input associating the first resource icon to a first task icon of the subset of temporarily modified task icons; and
- responsive to receiving the inputs, modifying the first task icon to illustrate an assignment of a first resource corresponding to the first resource icon.

19. The method of claim 18, wherein receiving the second input comprises detecting the first resource icon being dragged to and dropped on the first task icon.

20. The method of claim 18, further comprising:
- visually indicating remaining availability of the first resource by modifying the resource icon accordingly in relation to a workload of a selected task.

21. A system comprising:
- one or more hardware processors;
- one or more non-transitory machine-readable media storing instructions which, when executed by the one or more hardware processors, cause:
  - displaying a plurality of task icons representing a plurality of tasks in relation to respective time periods;
  - displaying a plurality of resource icons representing a plurality of resources;
  - receiving input dragging a first resource icon from the plurality of resource icons;
  - identifying a subset of the plurality of tasks as a candidate set of tasks that can be executed by the first resource; and
  - responsive to receiving the first input, temporarily modifying the display of a subset of task icons of the plurality of task icons corresponding to the subset of the plurality of tasks to illustrate that each task of the subset of the plurality of tasks can be executed by the first resource;
  - receiving input dropping the first resource icon to a first task icon of the subset of task icons having a temporarily modified display; and
  - based on the inputs, modifying the first task icon to illustrate an assignment of a first resource corresponding to the first resource icon.

22. The system of claim 21, the instructions further causing: visually indicating remaining availability of the first resource by modifying the resource icon accordingly in relation to a workload of a selected task.

* * * * *

UNITED STATES PATENT AND TRADEMARK OFFICE
CERTIFICATE OF CORRECTION

Page 1 of 1

PATENT NO. : 10,423,443 B2
APPLICATION NO. : 15/478202
DATED : September 24, 2019
INVENTOR(S) : Bhandari et al.

It is certified that error appears in the above-identified patent and that said Letters Patent is hereby corrected as shown below:

On the Title Page

Column 2, under Abstract, Line 9, after "associated" insert -- with --.

Signed and Sealed this
Twenty-second Day of September, 2020

Andrei Iancu
*Director of the United States Patent and Trademark Office*